May 15, 1934.  H. KELLER  1,958,826
TIRE CHAIN CONNECTING AND TIGHTENING DEVICE
Filed March 21, 1933
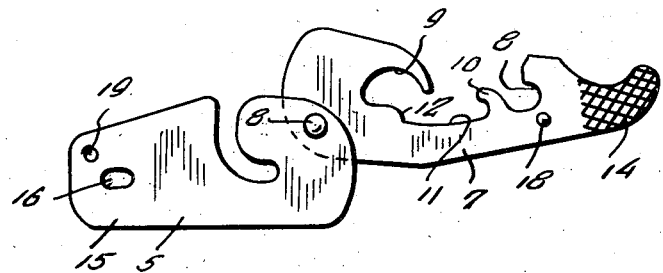
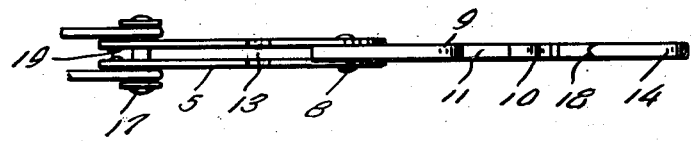
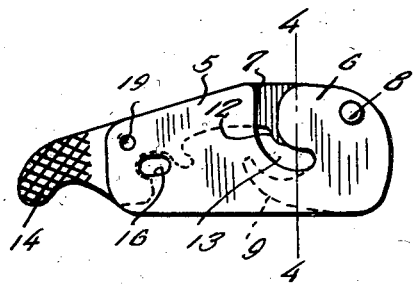
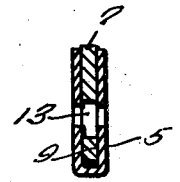
Inventor
Herman Keller
By Clarence A. O'Brien
Attorney Patented May 15, 1934

1,958,826

UNITED STATES PATENT OFFICE 1,958,826

TIRE CHAIN CONNECTING AND TIGHTENING DEVICE

Herman Keller, Pearl City, Ill.

Application March 21, 1933, Serial No. 661,962

2 Claims. (Cl. 24—116)

This invention relates to chain fastening and tightening devices of the type generally employed in connection with pneumatic tire chains.

In accordance with the present invention the device will not only serve as a fastener for the chain but also will serve for drawing the chain tight about the pneumatic tire.

The invention together with its numerous objects and advantages will be best understood from a study of the following description, taken in connection with the accompanying drawing wherein:

Figure 1 is a side elevational view of the device in a fully open position.

Figure 2 is a plan view thereof.

Figure 3 is a side elevational view of the device in a fully closed position and Figure 4 is a transverse sectional view taken substantially on the line 4—4 of Figure 3.

Referring to the drawing by reference numerals it will be seen that the device includes an outer member or casing 5 which is substantially U-shaped in cross section and is provided at one end with hooked jaws 6 between which an outer or locking lever 7 is pivoted adjacent one end as at 8.

The locking lever 7 on its inner face and adjacent its outer or free end is provided with a first hook 8 while at its inner or pivoted end the lever 7 is provided with relatively larger hook 9. Between the hooks 8 and 9 the lever 7 is provided with a third hook 10 that is disposed nearer to the hook 8 than to the hook 9, it being noted however that the hook 10 is curved in the direction of the hook 9 so that the free ends of the hooks 9, 10 terminate in spaced relation providing therebetween an entrance opening for an elongated chain receiving pocket 11 that extends between the open sides or concavities of the hooks 9 and 10 and terminate inwardly from the free end of the hook 9 in a guide shoulder 12, which shoulder 12, when the device is fully closed. is adapted to extend into a link receiving pocket 13 provided at the hooked end 6 of the casing 5. In forming the pocket 13 the sides of the casing are provided with opposed notches that are arcuate at their inner ends.

At its free end the lever 7 is provided with a knurled extension 14 to provide a finger grip that will serve to facilitate the closing of the device.

At the end 15 thereof the sides of the casing 5 are adapted to receive the hook 8 provided at the free end of the lever 7 when the device is closed, and at said free end the sides of the casing are provided with apertures 16 to receive a bolt or rivet 17 by which the fastener is pivotally connected to one of the end links of the tire chain as clearly suggested in Figure 2. It will be noted that the openings 16 are in the nature of slots so as to permit a shifting of the bolt 17 as the lever 7 is moved to a closed position. In this connection it will be noted that as the lever is thus moved to a closed position that hook 8 will engage the bolt 17 in a manner to cooperate with the bolt for securing the device in closed position.

As a further means for securing the device closed against accidental opening the lever 7 adjacent the end 14 thereof is provided with openings 18 therethrough with which teats or protuberances 19 pressed inward from the sides of the casing 5 will engage as the lever 7 is moved to closed position.

Preliminary to connecting the chain, the link at the free end of the chain is placed over the lever member 7 in engagement with the hook 8. The chain is connected sufficiently to enable the operator to make all necessary adjustments after which the proper link at the free end of the chain, subsequent to a disengagement of the end link from the hook 8, is engaged with the hook 10 of the lever 7. The lever 7 is then swung about its pivot into closed position. As the lever 7 swings to closed position the link of the chain engaging the hook 10 slides over the hook and into the link receiving pocket 11 and along the lever to the shoulder 12 as the chain is being pulled tight under the closing action of the device. As the lever reaches its final position, or the position shown in Figure 3 the shoulder 12 will serve to guide the link into the link receiving pocket 13, which pocket receives the link from the shoulder 12 when the device is in fully closed position. Manifestly as the lever 7 reaches its final closing position the said link of the chain will slide off the shoulder 12 and when the member 7 is closed tension of the chain on the bight of the hook 9 will aid in holding the device fully closed.

Before stated as the lever 7 moves to its final closed position hook 8 engages over the rivet 17 while the projections 19 snap into engagement with the openings 18 thus providing additional means for positively securing the device against accidental opening.

Even though I have herein shown and described the preferred embodiment of the invention, it is to be understood that I do not wish to limit myself to the precise details of construction and combination of parts as herein shown and accordingly claim all such forms of the invention to which I am entitled in the light of the prior art and scope of the appended claims.

Having thus described my invention, what I claim as new is:

1. In a tire chain connecting and tightening device, a casing, hooked jaws on one end of the casing, a locking lever pivoted at one end to the casing between said jaws, a hook formed on each end portion of said lever, an intermediate hook formed on said lever between the first two hooks confronting the hooks at the pivoted end of the lever but being nearer to the hooks at the free end of the lever, the hook at the pivoted end of the lever and said intermediate hook confronting one another and forming therebetween an elongated arcuate link receiving pocket, a shoulder at that end of said pocket nearer to the hook at the pivoted end of the lever; the hook at the pivoted end of the lever, and the jaws at said one end of the casing serving as a pocket for one end link of a tire chain, said shoulder serving as a guide for directing said end link of the chain into the said pocket, a rivet engaging slot in the sides of the casing at the other end of the latter to form a connection for the other end link of the chain, and the hook at the free end of the lever adapted to engage the rivet when the device is in closed position.

2. In a tire chain connecting and tightening device, a casing, hooked jaws on one end of the casing, a locking lever pivoted at one end to the casing between said jaws, a hook formed on each end portion of said lever, an intermediate hook formed on said lever between the first two hooks confronting the hooks at the pivoted end of the lever but being nearer to the hooks at the free end of the lever, the hook at the pivoted end of the lever and said intermediate hook confronting one another and forming therebetween an elongated arcuate link receiving pocket, a shoulder at that end of said pocket nearer to the hook at the pivoted end of the lever; the hook at the pivoted end of the lever, and the jaws at said one end of the casing serving as a pocket for one end link of a tire chain, said shoulder serving as a guide for directing said end link of the chain into the said pocket, a rivet engaging slot in the sides of the casing at the other end of the latter to form a connection for the other end link of a chain, and the hook at the free end of the lever adapted to engage the rivet when the device is in closed position, and interengaging means on said lever and on the sides of the casing at the last named end thereof serving as an additional means for holding the device in closed position.

HERMAN KELLER.